(12) United States Patent
Döring

(10) Patent No.: US 8,147,762 B2
(45) Date of Patent: Apr. 3, 2012

(54) PARTICLE SEPARATOR, ESPECIALLY A PARTICLE FILTER, FOR THE SEPARATION OF PARTICLES FROM THE EXHAUST GAS STREAM OF AN INTERNAL COMBUSTION ENGINE

(75) Inventor: Andreas Döring, München (DE)

(73) Assignee: MAN Nutzfahrzeuge Aktiengesellschaft, München (DE)

( * ) Notice: Subject to any disclaimer, the term of this patent is extended or adjusted under 35 U.S.C. 154(b) by 321 days.

(21) Appl. No.: 12/540,132

(22) Filed: Aug. 12, 2009

(65) Prior Publication Data
US 2010/0037600 A1 Feb. 18, 2010

(30) Foreign Application Priority Data
Aug. 12, 2008 (DE) .......................... 10 2008 038 736

(51) Int. Cl.
*B01D 50/00* (2006.01)
(52) U.S. Cl. ........................................ 422/173; 422/180
(58) Field of Classification Search ................... 422/177, 422/180
See application file for complete search history.

(56) References Cited

U.S. PATENT DOCUMENTS

| 5,397,545 A * | 3/1995 | Balling et al. ................. 422/171 |
| 2004/0037754 A1* | 2/2004 | van Setten et al. ............. 422/177 |
| 2006/0191248 A1 | 8/2006 | Bardhan et al. |
| 2008/0041040 A1* | 2/2008 | During ............................. 60/295 |

FOREIGN PATENT DOCUMENTS
DE 10238770 3/2004
DE 102004028811 1/2005
* cited by examiner

*Primary Examiner* — Tom Duong
(74) *Attorney, Agent, or Firm* — Cozen O'Connor

(57) ABSTRACT

A particle separator for the separation of particles from the exhaust gas stream of an internal combustion engine. The particle separator includes different heat transfer zones arranged at least in the main flow direction of an exhaust gas stream through the particle separator, different, that is, with respect to heat storage capacity and/or thermal conductivity and/or the heat-transfer properties from the exhaust gas stream to the particle separator. Each of these different zones makes it possible for a precisely defined amount of heat to be transferred from the exhaust gas stream to the individually assigned sections of the particle separator.

16 Claims, 3 Drawing Sheets

PARTICLE SEPARATOR, ESPECIALLY A PARTICLE FILTER, FOR THE SEPARATION OF PARTICLES FROM THE EXHAUST GAS STREAM OF AN INTERNAL COMBUSTION ENGINE

BACKGROUND OF THE INVENTION

1. Field of the Invention

The present invention relates to a particle separator, especially a particle filter, for the separation of particles from the exhaust gas stream of an internal combustion engine.

2. Description of the Related Art

According to the present invention, the term "particle separator" is understood as a type of particle separator with flow channels, which are significantly larger in diameter than the largest occurring exhaust gas particle. Particle separator also covers what are usually called particle filters, which have flow channels with diameters in the range of the diameters of the particles present in an exhaust gas stream and/or in the case of which the exhaust gas flows through a filter medium. Particle filters are subject to clogging, which has the effect of increasing the backpressure—an effect that gets worse as the quantity of deposited soot increases—and also lowers engine power.

A known way of regenerating a particle filter consists oxidizing the carbon-containing soot present in the particle filter. For this purpose, the exhaust gas temperature is actively raised to more than 550° C., as a result of which it becomes possible for oxidation to occur with the residual oxygen present in the exhaust gas. The exhaust gas temperature is increased by the addition to the exhaust gas of hydrocarbons, which are oxidized on a catalyst installed upstream of the particle filter. The heat liberated by this reaction leads to the required increase in temperature, which leads in turn to the oxidation of the soot deposited at the inlet to the filter according to the following equation:

$$C + O_2 \rightarrow CO_2$$

Because this reaction proceeds exothermically, the exhaust gas becomes even hotter, so that the exhaust gas temperature rises continuously as the gas proceeds toward the filter outlet. Because the regeneration must be actively induced, this is so-called "active" filter regeneration.

Another way of regenerating a particle filter is known from EP 0 341 832 A2. Here the nitrogen monoxide (NO) present in the exhaust gas is oxidized to nitrogen dioxide ($NO_2$) in an oxidation catalyst upstream of a particle filter with the residual oxygen also present. This nitrogen dioxide reacts in turn in the particle filter with the carbon particles to form CO, $CO_2$, $N_2$, and NO. This is called so-called "passive" regeneration.

To improve soot burn-off, particle filters are being provided with a catalytic coating for the oxidation of nitrogen monoxide. These catalysts usually contain platinum. The disadvantage here is that the nitrogen dioxide formed on the particle filter can be used only to oxidize particles deposited downstream of the catalytically active layer for nitrogen monoxide oxidation within the filter medium. If a layer of deposited particles, a so-called "filter cake", forms on the surface of the filter and therefore on the catalytically active layer, the nitrogen monoxide oxidation catalyst then lies downstream of the filter cake, which means that the soot particles deposited there cannot be oxidized with the help of nitrogen dioxide coming from the nitrogen monoxide oxidation catalyst applied to the particle filter. For these reasons, in spite of the catalytic coating on the particle filter, it is impossible to dispense with a nitrogen monoxide oxidation catalyst upstream of the particle filter, and this results in a structure with a relatively large overall volume.

Additives such as iron and/or cerium, which lower the ignition temperatures to approximately 350° C., can be used to regenerate the particle filter.

Common to all of the methods or systems described is that, if it is not possible to oxidize all of the carbon deposited in the particle filter, the amount of carbon and thus the exhaust gas backpressure will increase continuously. When a certain critical mass is reached, it is possible at high exhaust gas temperatures for the carbon to ignite in an uncontrolled manner; the carbon then burns up very quickly in the oxygen. This causes the temperature to increase to as much as 1,200° C., which damages the particle filter. As previously described in connection with active regeneration, the maximum temperatures are usually at the outlet of the filter.

Such damage can be almost completely avoided by the use of more heat-resistant materials such as silicon carbide or aluminum titanate in place of the normally used cordierite. Nevertheless, these highly heat-resistant materials are very difficult to process, very expensive, and also heavier than the conventional materials. Another disadvantage of these highly heat-resistant materials is that their heat capacity is usually greater than that of, for example, cordierite. This greater capacity to store heat means that temperature peaks are capped. This is critical, especially in the case of active filter regeneration, because more heat must be supplied to achieve the ignition temperatures at the filter inlet in spite of the buffering effect of the filter substrate with its high heat storage capacity.

SUMMARY OF THE INVENTION

Proceeding from the above-described prior art, it is therefore a goal of the present invention to create a particle separator, especially a particle filter that has high thermal stability. The filter reliably avoids overheating of the exhaust gas stream and thus avoids the associated uncontrolled ignition of the soot deposited in the downstream area of the particle separator.

According to one embodiment of the invention, the particle separator comprises different heat transfer zones arranged at least in a main flow direction of the exhaust gas stream through the particle separator. The different heat transfer zones are different with respect to the properties of the heat transfer from the exhaust gas stream to the particle separator, each of these different zones making it possible for a precisely defined amount of heat to be transferred from the exhaust gas stream to the individually assigned sections of the particle separator. According to a preferred embodiment, the heat-transfer zones are designed such that the heat-transfer coefficient and/or the heat storage capacity increases in the flow direction, as a result of which the amount of heat transferred from the exhaust gas stream to the particle separator increases in the main flow direction.

As a result, the temperature in the inflow zone of the particle separator increases quickly, especially in the case of active regeneration of the particle separator, especially of a particle filter, whereas more heat is extracted from the exhaust gas as it continues to flow through the particle separator and is transferred to the substrate of the particle separator. This prevents the exhaust gas stream from becoming too heated as it flows in the main flow direction and thus prevents of the uncontrolled ignition of the soot deposited in the rear area of the particle separator, i.e., the downstream part with respect to the flow direction of the exhaust gas stream.

Particle separators are preferably designed with a plurality of flow channels. In a preferred embodiment of the particle separator as a particle filter as defined above, the particle filter is preferably designed as a surface particle filter or a deep-bed particle filter.

The different heat-transfer zones differ at least in certain areas with respect to their heat conduction within the particle filter and/or with respect to the heat storage capacity of the particle filter and/or with respect to the transfer of heat (by conduction, convection, and radiation) between the particle filter and the gas stream. For example, the heat storage capacity and heat conduction can be varied by changing the porosity of the separator substrate in the main flow direction. It is also conceivable that different materials with different heat capacities could be provided in the main flow direction. For example, the inflow zone of ceramic filter substrates could be made of cordierite, whereas the outflow zone could be made of aluminum titanate or silicon carbide, as a result of which the heat capacity and thus the heat storage capacity increase in the direction toward the filter outlet. This is just one of many possibilities, which has been given merely by way of example for the sake of better understanding.

The heat storage capacity can be increased by increasing the mass of the substrate of a particle separator in a predetermined area to arrive at the desired heat transfer zones with their different heat storage and possibly different heat transfer properties. It is especially advantageous to increase the mass of the substrate by increasing the wall thickness of a separator substrate in the main flow direction. Another possibility of increasing the heat storage capacity in the case of honeycomb filter substrates consists of introducing intermediate walls on the inflow and/or outflow side. This increases the cell density and thus the mass and thus the heat storage capacity. In spite of the higher cell density, the backpressure is increased only slightly in a configuration of this type, because most of the backpressure of such a system is produced by the flow through the filter material and the soot or ash particles deposited therein or thereon, not on the inflow or outflow side. Such particle filters can be produced quite easily by the extrusion of cordierite, aluminum titanate, or silicon carbide, wherein channels on the inflow and outflow side can be closed off alternately with plugs, for example, to force the gas to flow through the filter walls. In the case of these ceramic filter substrates as a preferred embodiment, it is possible to produce the filter substrate and the intermediate walls in a single step, because, through the selection of a suitable die with alternating high and low cell densities, parallel channels with different channel cross sections can be produced very easily. Nevertheless, care must be taken to ensure that the intermediate walls do not extend over the entire cross section of the channel but rather only across the rear area of the particle filter substrate and/or that the thickness of the intermediate walls increases toward the outlet of the particle filter. After that, as already explained above, the channels are closed on the gas inlet or gas outlet side so that the gas must pass through the filter substrate.

A particle separator, which comprises a plurality of essentially parallel flow channels, is especially preferred. The flow channels themselves comprise cross sections, which are the same in themselves, or the same as each other or which are different at least in certain parts. According to a preferred embodiment, a first set of flow channels thus forms a raw exhaust gas side, which accepts the raw exhaust gas stream, while a second set of flow channels, which is separated from the raw exhaust gas side flow channels by a gas-permeable flow channel wall area which holds back particles of a predetermined size, forms a clean gas side, from which the clean gas departs. The flow channels are alternately closed off on the inflow side and outflow side in a predetermined pattern relative to the main flow direction by separate or integrally formed closure elements to form raw exhaust gas-side and clean exhaust gas-side pockets or blind holes.

In at least some of the flow channels, at least one insert element extends over a predetermined part of the distance of the main flow direction and comprises a predetermined shape, as a result of which a heat-transfer zone is formed with heat-transfer and/or heat-storage properties which are different from those of at least one heat-transfer zone adjacent to it in the main flow direction. The insert can in principle have any desired shape, e.g., it can be designed as an intermediate wall or as a cooling rib. It is also possible to use spherical, knob-like, pin-like, or spade-like shapes. The insert elements can be made of the same material as that of the particle separator itself or of a different material. Thus, in addition to ceramic materials, it would also be possible to use metal foils, sintered metal plates, or expanded-metal foils to produce the particle filter.

With these materials, suitable shaping can produce a relatively large surface area on both the gas inlet and the gas outlet side of the particle filter without the need for separate, additional inserts. If separate inserts such as spirals, spacers, webs, or the like are necessary to increase the surface area of these types of insert elements, they can be fixed in place by simple brazing or welding or by simple nonpositive or positive connections to the metal foils or plates.

By the use of these insert elements, the heat-transfer properties between an exhaust gas stream and the particle separator can be changed in the predetermined direction easily and effectively in such a way that the different heat-transfer zones are formed as desired. These types of insert elements can be used not only to increase the geometric surface area but also to increase the turbulence, which also improves the heat transfer. The particle separator can be made with even greater insensitivity to heat if these types of insert elements are provided not only on the raw gas side but also on the clean gas side, so that the heat supplied to, for example, the substrate of the particle separator on the raw gas side can be carried away again on the clean gas side by way of the cleaned exhaust gas stream.

It is also possible for the heat transfer and/or the heat storage capacity of the particle filter in particular to increase initially in the main flow direction from the inlet into the substrate and then to decrease again as the flow proceeds toward the outlet of the substrate. This has the result that the maximum heat transfer or maximum heat storage capacity lies between the inlet and the outlet, wherein it has been found advantageous for the maximum to be located in an area between the center and 90% of the substrate length, as seen from the inlet. This ensures that heat is extracted from the exhaust gas stream upstream of the outlet and that not too much heat is transferred to the filter substrate in the direction toward the outlet, which could lead to thermal damage.

The particle separator is preferably designed as a particle filter with a ceramic filter substrate. Of course, the inventive measures can also be used in conjunction with metallic particle separators or with filters or separators, which consist of ceramic and/or glass and/or silicate and/or quartz-containing fibers.

To minimize the space occupied by the overall exhaust gas post-treatment system, it is advisable to coat the particle separator with catalytically active material to eliminate the need for separate catalysts or at least to make it possible to reduce the size of such separate catalysts. These catalysts can be diesel oxidation and/or SCR and/or NO oxidation and/or 3-way and/or $NO_x$ storage and/or $NH_3$ oxidation and/or urea decomposition catalysts.

To keep the exhaust gas backpressure low, the quantity of catalyst applied to the particle separator is kept small. Thus, for example, the applied mass is typically less than 50% of the mass of the filter walls, for example, of a particle filter. This mass, however, can be increased if the porosity of the washcoat is increased to preferably more than 53%.

To keep the volume of a particle separator small, the catalyst is applied primarily to the gas-permeable areas of the particle separator, preferably designed as a particle filter, and to the insert elements used to improve the heat-transfer and/or the heat-storage capacity.

Platinum and/or platinum oxide and/or zeolites are suitable as active material for the oxidation catalyst for converting nitrogen monoxide to nitrogen dioxide. The same is true for $NH_3$ oxidation catalysts.

Vanadium and/or $V_2O_5$ and/or $WO_3$ and/or $WO_3/TiO_2$ and/or iron zeolites and/or cobalt zeolites and/or copper zeolites can be considered as active components for SCR catalysts.

Platinum and/or palladium and/or rhodium and/or barium and/or calcium is used as the active component for the $NO_x$ storage catalyst. Platinum and/or palladium and/or rhodium is preferably used as the active component for the 3-way catalyst.

$TiO_2$ and zeolites are again preferred as catalytically active substances for urea decomposition.

Another possibility consists in providing the particle separator itself, especially the particle filter, and the insert elements with different catalysts and/or different degrees of catalyst loading. Because, as a result of the oxidation of the soot, the temperatures on the soot-coated walls of the filter are higher than those on the insert elements, especially when the elements are installed on the outflow side, it is advisable for the catalyst applied to the particle filter, for example, to have greater thermal stability that the catalyst applied to the insert elements.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in greater detail below on the basis of drawings.

DETAILED DESCRIPTION OF THE PRESENTLY PREFERRED EMBODIMENTS

Figure 1:
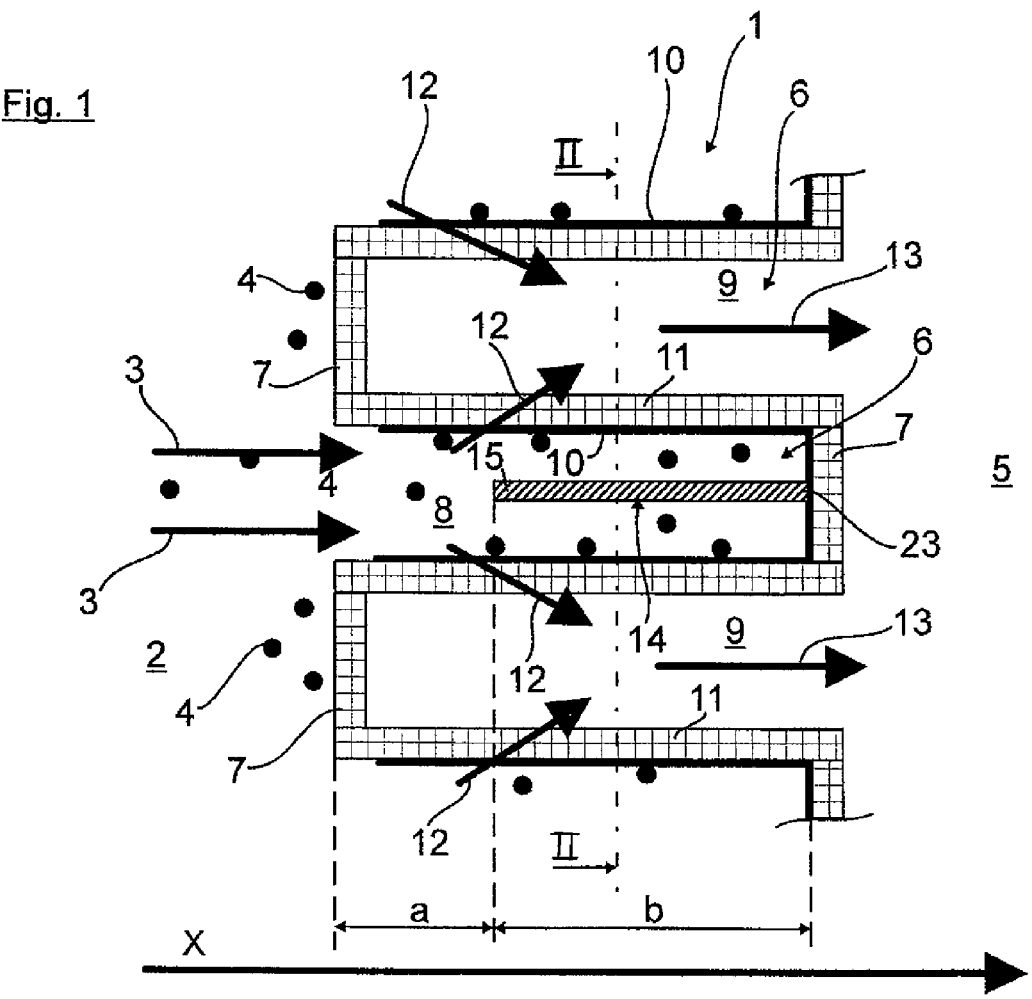
FIG. 1 is a schematic longitudinal cross section through a particle filter with intermediate walls on the raw gas side to increase the heat storage capacity in a direction toward the filter outlet.
Figure 2:
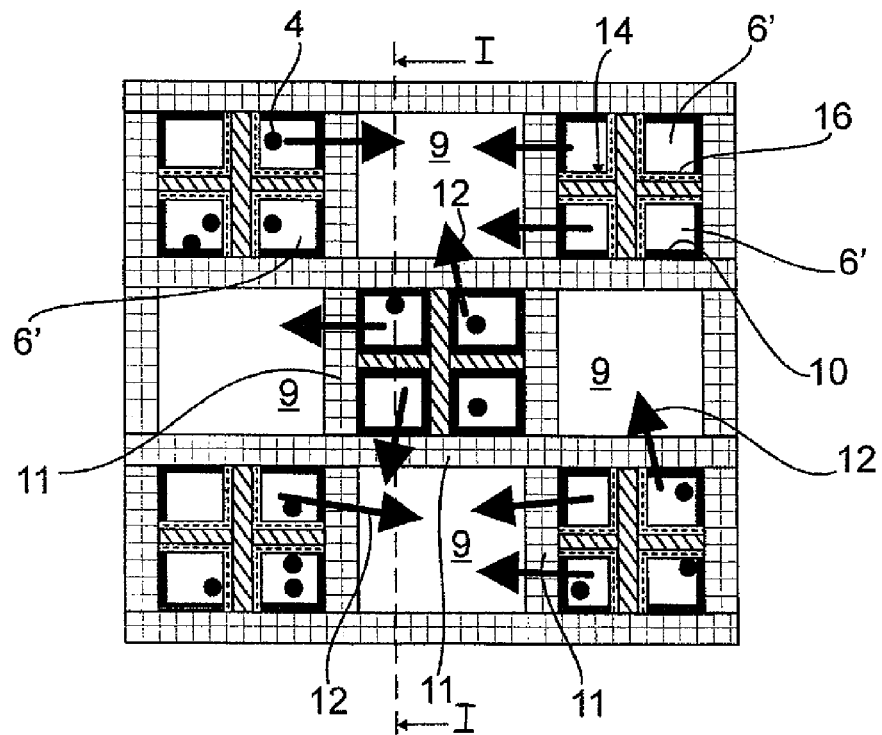
FIG. 2 is a schematic cross section along line II-II of FIG. 1 together with catalytically coated intermediate walls.

FIG. 1 is a schematic longitudinal cross section through an inventive particle filter 1, which is a cross section along line I-I of FIG. 2. FIG. 2 thus shows a cross section along line II-II of FIG. 1.

A raw exhaust gas stream 3, which carries with it a plurality of soot particles 4 to be separated, flows toward the inflow side 2 of this particle filter 1.

The particle filter 1 comprises a plurality of directly adjacent, parallel flow channels 6, which here, purely by way of example, are closed off in alternation on the inflow side 2 and on the opposite outflow side 5, i.e., opposite in the main flow direction "x", by an end wall 7, which can be an integral part of the filter. The individual flow channels 6 form first blind hole-like or pocket-like chambers 8 open to the inflow side 2 and, alternating with them, blind hole-like or pocket-like chambers 9 open to the outflow side 5. As filter material for the particle filter 1, it is possible to use cordierite, aluminum titanate, silicon carbide, sintered metal, ceramic fibers, silicate fibers, or knitted metal meshes.

As can be easily seen in FIG. 1, the raw exhaust gas stream 3 loaded with soot particles 4 arrives at the inflow side 2 of the particle filter 1 and deposits the soot particles 4 especially in the first blind hole-like or pocket-like chambers 8 to form a so-called filter cake 10, before the exhaust gas 12, thus cleaned of the soot particles, flows through the gas-permeable chamber walls into the second blind hole-like or pocket-like chambers 9, from which it then departs as clean gas 13.

As can also be clearly seen from a consideration of FIGS. 1 and 2 together, that an insert element 14 is arranged in each of the first chambers 8. This insert element is connected on the outflow side to the end wall 7 at point 23, and its free end 15 is a predetermined distance "a" from the end of the particle filter on the inflow side. The insert element 14, as illustrated only schematically in FIG. 2, is formed by intermediate walls with a cross-like shape, which divides the first chamber 8 into four individual flow channels 6', which extend in the longitudinal direction of the insert element 14, seen in the main flow direction "x". Through the introduction of this type of insert element 14 into the rear part of the first chamber 8, the surface area in this part is multiplied. In the selected example, this area is almost quadrupled. As a result, a heat-transfer zone is formed over the length "b" of the insert element 14 extending in the main flow direction "x", namely, a zone which has a much higher capacity for heat transfer from the exhaust gas stream to the particle filter 1 and a higher heat-storage capacity than the heat-transfer zone lying on the inflow side, i.e., the zone of the insert element 14 extending over the length "a" from the free end 15.

That means that, as a result of the presence of the insert elements 14 in the first chambers 8, zones (two such zones in the present example) with heat-transfer coefficients that differ in the main flow direction "x" of the exhaust gas stream are formed. In this example, the heat-storage capacity of these heat-transfer zones is lower in the heat-transfer zone characterized by the length "a" than in the heat-transfer zone characterized by the length "b". In this embodiment, therefore, a particle filter 1 is made available with a heat-storage capacity which increases in the main flow direction "x" in the same way that the heat transfer between the particle filter 1 and the gas stream increases.

Heat is therefore extracted by the insert element 14 from the raw exhaust gas stream 3 as the stream flows through the raw gas-side first chamber 8, namely, in the rear area of the first chamber 8 with respect to the main flow direction "x". If a catalyst for the oxidation of nitrogen monoxide is installed upstream of the particle filter 1, the $NO_2$ which is formed will be forced together with the exhaust gas 12 through the filter cake 10 deposited on the chamber walls 11. When the $NO_2$ with which the exhaust gas has been enriched makes contact with the filter cake 10, it reacts with the soot particles 4 to form CO, $CO_2$, $N_2$, and NO, wherein these reactions proceed continuously, so that the filter cake 10 can be kept at an essentially constant thickness and the exhaust gas backpressure caused by the filter cake can be kept at an essentially constant level.

As an alternative to the continuous passive regeneration of the particle filter 1, in conjunction with an upstream catalyst for the oxidation of NO described above, there is the possibility of actively regenerating the particle filter 1 in cycles. For this purpose, the temperature in the raw exhaust gas stream 3 is increased in a known manner by the addition of hydrocarbons and their oxidation to such an extent that it is possible to oxidize the soot particles 4 with the help of oxygen. It is here in particular that the advantages of the present invention become evident: the exhaust gas temperature in the inlet area of the raw exhaust gas stream 3, that is, on the inflow side, can be rapidly increased to initiate the oxidation of the carbon-containing soot particles 4. The insert elements 14 installed downstream then buffer the temperature peaks caused by the exothermic oxidation of the soot particles and prevent the exhaust gas temperature from increasing to a level, which could cause thermal damage to the particle filter 1.

It is also possible to allow the heat transfer and/or the heat-storage capacity of the particle filter in particular to increase not all the way to the outlet of the substrate but rather only as far as the center. This ensures, first, that heat is extracted from the exhaust gas stream and, second, that not too much heat is transferred to the filter substrate in the direction toward the outlet, which would lead to thermal damage. This can be accomplished in the present case by removing the insert walls 14 in the outlet and inlet areas of the particle filter; for the sake of clarity, however, this is not shown in FIG. 1.

As a result of the lower temperatures attributable to the use of the insert elements 14, it is possible to apply thermally sensitive catalysts such as $NO_x$ storage catalysts, SCR catalysts, NO oxidation catalysts, $NH_3$ oxidation catalysts, 3-way catalysts, and/or urea decomposition catalysts to the particle filter 1 without their being damaged by excessive heat. Depending on their function, these catalysts can be applied on the inflow and/or outflow side and/or throughout the entire filter, at least in certain areas.

The increase in the local temperature on the inflow side 2 of the particle filter 1 that occurs during the regeneration of the particle filter 1 as described above can be isolated relatively effectively from the outflow side 5 by the suitable selection of material and based on the heat-storage capacity of the filter material. It is therefore advisable to apply the types of catalysts which are especially thermally unstable such as $V_2O_5$-based SCR catalysts and/or iron-containing, copper-containing, or cobalt-containing zeolites more in the direction toward the outflow side 5, that is, on the outflow side.

For thermal stability, it is advantageous for the loading of the particle filter with catalytically active material to decrease in the main flow direction "x" of the exhaust gas and/or to increase in the flow direction through the filter medium, especially through the filter wall. As a result, the points carrying the greatest load of soot and thus subject to the highest levels of liberated heat in the case of an uncontrolled regeneration, i.e., the points located in the end area and on the raw gas side of the filter wall, are separated locally from the catalytically active coatings. This is achieved either by constructing the particle filter 1 itself out of a series of layers, wherein the loading of the layers with catalytically active material decreases in the main flow direction "x" of the exhaust gas, or by loading the filter with the catalytically active material by coating or impregnating the outflow side 5 of the particle filter in such a way that the degree of loading of the filter material decreases with increasing penetration depth of the coating or impregnation solution, from the clean gas side toward the raw gas side. To produce the blind-hole structure of the particle filter 1, either a plurality of tubular shapes are combined into a tight packing, wherein adjacent flow channels 6, or tubes, as previously described, are alternately closed off either on the inflow side 2 or on the outflow side 5. As previously described, this closing-off can be achieved with the same material as that of the particle filter 1. The material may alternatively be different.

In the case of the structures discussed above, the one-sided loading of the particle filter 1 with catalyst material can be accomplished by, first, closing off only every second opening on the outflow side 5 and by then immersing the filter body of the particle filter 1 into a coating or impregnating solution, as a result of which the coating or impregnating solution rises into the flow channels 6 which are open toward the outflow side 5. After the coating or impregnation process, the excess coating or impregnating solution is blown out, and the coated or impregnated channels are then closed off on the inflow side 2.

One method for producing the blind hole-like or pocket-like chamber structures comprises preparing packings of plates, held a certain distance apart, wherein the adjacent open areas obtained as a result of the spacing are alternately closed off on the inflow side 2 and the outflow side 5, so that a pocket-like structure is formed. The desired loading of the inflow side 2 and/or of the outflow side 5 with catalyst material can then be accomplished by loading one side of the plates used to produce the structure with catalyst material and by coating the plates in such a way that two facing loaded sides alternate with two facing non-loaded sides. The loading of the plates can be accomplished by building the plates in layers, wherein the degree to which the layers are loaded with catalyst material is varied. There is also the possibility of loading the plates with catalyst material by spraying or brushing with catalytically active coating or impregnating solutions.

To improve the effectiveness with which ammonia is split off from a reducing agent such as an aqueous urea solution for the operation of a downstream SCR catalyst, it is advantageous to provide a catalyst that can promote this splitting and prevent the formation of cyanuric acid. The formation of cyanuric acid is problematic, because it can cause the particle filter 1 to become blocked, which leads to the failure not only of the exhaust gas post-treatment system but also of the entire internal combustion engine. The catalyst for improving the effectiveness with which ammonia is split off from the reducing agent can be produced by loading or coating the inflow side 2 of the particle filter 1 with a catalyst, which can promote the splitting-off reaction. Materials that can be used include, for example, $TiO_2$, $TiO_2/SiO_2$, $TiO_2/SiO_2/Al_2O_3$, and zeolites. The catalyst can be applied appropriately by means of the same procedures as those described above.

As can be seen in FIG. 2, arranging the insert elements 14 to form cross-shaped intermediate walls results in a considerable improvement in the heat transfer and/or provides more mass for heat storage in the rear chamber area of the first chamber 8. In addition, because of its large geometric surface area, the insert element 14 becomes a logical choice for a catalytic coating 16, wherein the catalytic coating can also be provided merely in partial areas of the one or more insert elements 14.

Figure 3:
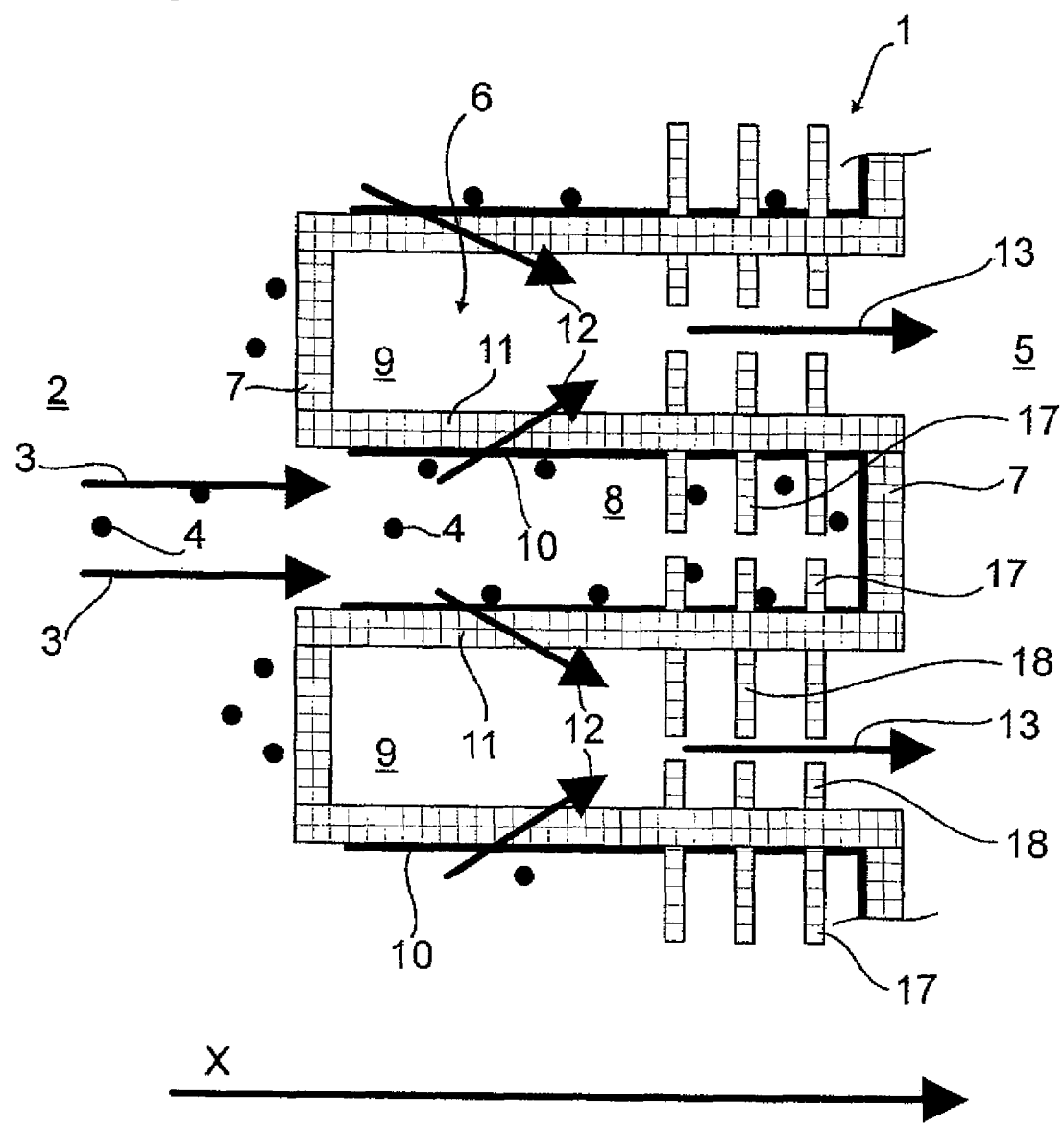
FIG. 3 is a schematic longitudinal cross section through an inventive particle filter with cooling ribs for conducting heat away from the raw gas side to the clean gas side.

The heat transfer can be improved even more by the use of cooling ribs 17, 18 as shown in FIG. 3. Parts which are the same as those used in the embodiment according to FIG. 1 are designated by the same reference numbers and are not described again in detail; instead, reference is made to the associated description of FIG. 1. The cooling ribs 17 and 18 are in this case attached to the filter medium, namely, on the raw exhaust gas side in the first chambers 8 (cooling ribs 17) and on the clean exhaust gas side in the second chambers 9 (cooling ribs 18). They can thus carry away high temperatures to the soot-free clean side of the second chamber 9, as a result of which uncontrolled ignition of the carbon-containing soot on the raw exhaust gas side in the first chambers 8 can be reliably avoided.

Figure 4:
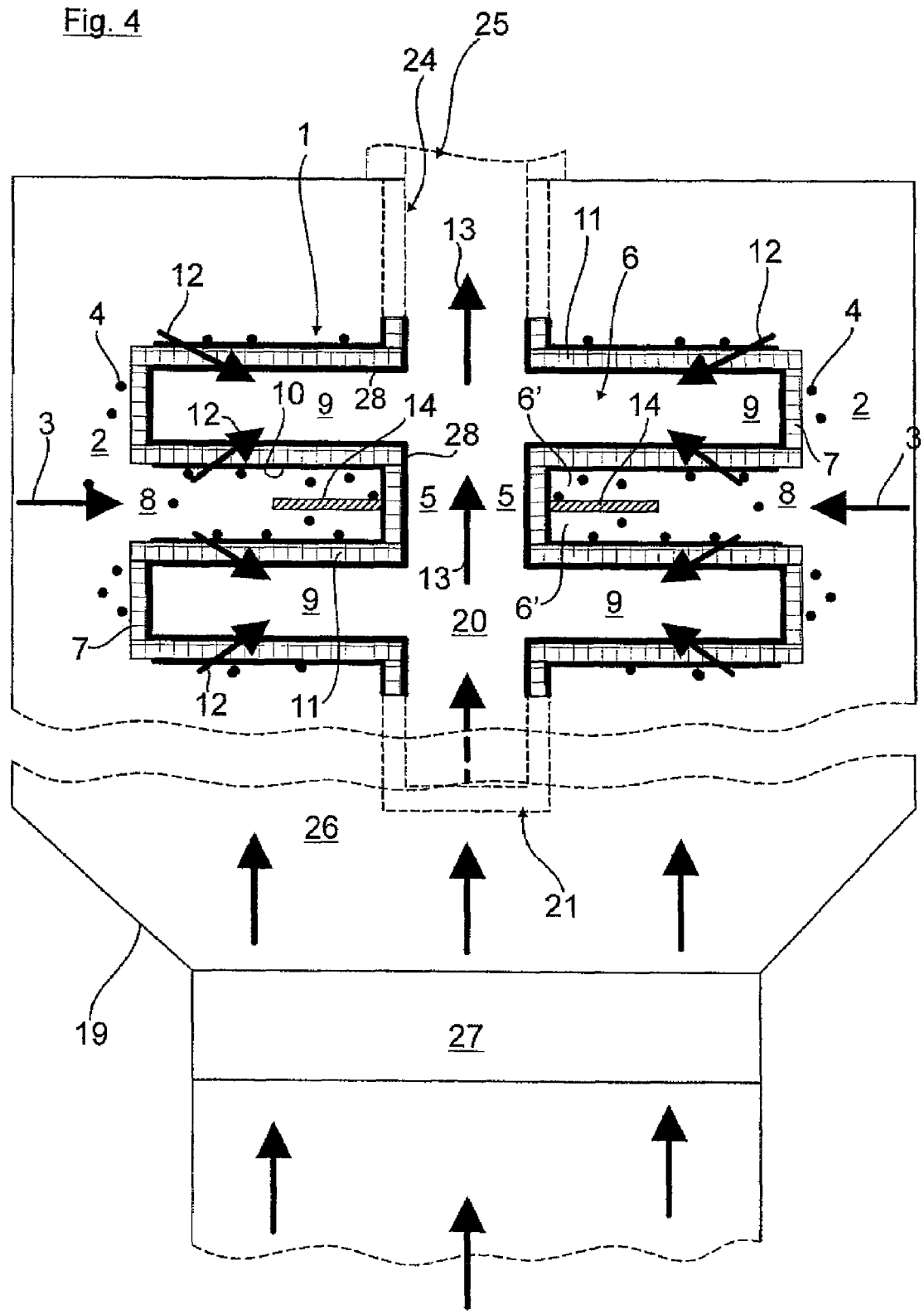
FIG. 4 is a schematic diagram of a particle filter, which is integrated into a sound damper housing.

FIG. 4 is an especially preferred arrangement of a particle filter 1 designed essentially in the same way as that of FIG. 1 in a sound-damper housing 19. In the cross-sectional view shown here, the particle filter 1 comprises opposing areas 6,6', which are arranged or aligned with respect to each other in a manner something like that of an accordion, so that a clean gas interior space 20 is formed between the two clean gas sides of the particle filter 1; this interior space is closed off at one end 21, which is on the inflow side 22 of the sound damper housing 19, whereas the end 24 of the clean gas interior space 20 is open to the end 21 in the direction toward the outflow side 23 of the sound damper housing and adjoins the outflow opening 25 of the sound damper housing 19. Overall, therefore, the particle filter 1 comprises a contour that surrounds the clean gas interior space 20 in a ring-like manner.

The interior space of the sound damper housing 19 is thus divided by the accordion-like particle filter 1 into the previously mentioned clean gas interior space 20 and the exterior space 26, lying between the walls of the sound damper housing 19 and the particle filter 1. In the area of the inflow side 22 of the sound damper housing 19, furthermore, an oxidation catalyst 27, by way of example, is also arranged, which converts some of the nitrogen monoxide present in the exhaust gas stream to nitrogen dioxide and/or which oxidizes the hydrocarbons which have been metered into the exhaust gas stream at a point upstream of the oxidation catalyst 27 at predetermined times and in predetermined amounts for the purpose of raising the exhaust gas temperature. In addition or as an option, an oxidation catalyst can also be arranged outside the sound damper housing. In one embodiment, the particle separator coated with a catalytically active layer 28.

Otherwise, the function and structure of the particle filter 1 is the same in principle as those, which have been described explicitly in conjunction with the embodiment of FIG. 1, so that, to avoid unnecessary repetition, reference is made to these explanatory passages.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A particle separator configured for the separation of particles from an exhaust gas stream of an internal combustion engine, the particle separator comprising:
    at least two heat transfer zones arranged in respective sections along respective lengths of a main flow direction of the exhaust gas stream, the main flow direction extending from an inflow side to an outflow side of the particle separator, the at least two heat transfer zones each having at least one of a different heat storage capacity, a thermal conductivity, and heat-transfer properties from the exhaust gas stream to the particle separator, each of the at least two heat transfer zones configured for a defined amount of heat to be transferred from the exhaust gas stream to the respective sections of the particle separator; and
    at least one insert element having a predetermined shape extending over a predetermined part of a distance of the main flow direction, the at least one insert element forming one of the at least two heat-transfer zones with a heat-transfer property different from that of an adjacent one of the at least two heat-transfer zones in the main flow direction, wherein the at least one insert has a shape in the form of at least one of a wall, a cooling rib, a sphere, a knob, a pin, and a spade.

2. The particle separator according to claim 1, wherein the at least two heat-transfer zones are configured such that the amount of heat which can be transferred from the exhaust gas stream to the particle separator increases in the main flow direction to an outlet of the particle separator.

3. The particle separator according to claim 1, wherein the at least two heat transfer zones are configured such that the amount of heat transferred from the exhaust gas stream to the heat-transfer zones of the particle separator reaches a maximum in the main flow direction at substantially between 50-90% of a length of the particle separator and then decreases again toward the outlet.

4. A particle separator according to claim 1, wherein at least two areas of the at least two heat transfer zones differ with respect to at least one of porosity of a substrate material for the at least two heat transfer zones, substrate material for the at least two heat transfer zones, substrate mass for the at least two heat transfer zones, and a thickness of the substrate material.

5. The particle separator according to claim 1, further comprising:
    a plurality of flow channels substantially parallel to each other,
    wherein a first set of the plural flow channels are configured as raw exhaust gas side channels, configured to accept the raw exhaust gas stream in the main flow direction of the exhaust gas stream, and
    a second set of the plural flow channels are configured as exhaust gas side channels; and
    a gas-permeable wall configured to capture particles of a given size separating the first set of the plural flow channels from the second set of the plural flow channels are separated from the raw exhaust gas-side flow channels, such that the second set of flow channels form a clean gas side,
    whereby a clean gas stream exits the particle separator.

6. The particle separator according to claim 5, further comprising:
   raw exhaust gas-side pockets arranged on the raw exhaust side of the particle separator; and
   clean gas-side pockets arranged on the exhaust side of the particle separator,
   wherein the raw exhaust gas-side pockets and the clean gas-side pockets are formed by alternately closing the flow channels on the inflow side and on the outflow side in a predetermined pattern by at least one of separate or integrally formed closure elements.

7. The particle separator according to claim 6 wherein the closure element comprises at least one of plugs and end walls.

8. The particle separator according to claim 5, wherein the at least one insert element is arranged in at least one of the plural flow channels.

9. A particle separator according to claim 8, wherein the at least one insert element is connected to the separator in integral fashion.

10. A particle separator according to claim 9, further comprising at least one of:
   a first catalytically active layer forming at least one first catalyst coated on at least certain areas of the particle separator; and
   a second catalytic active layer forming at least one second catalyst coated on at least one partial area of the at least one insert element,
   wherein a composition of the first and the second catalytically active layers differ in at least one of:
   a predetermined area at least in the main flow direction,
   a loading of the first and the second catalytically active layer, and
   a thickness of the first and the second catalytically active layer, wherein one of:
      the first and the second catalytically active layer decrease in the main flow direction, and
      the first and the second catalytically active layer increase in the flow direction.

11. The particle separator according to claim 10, further comprising:
   a catalyst material coating on the inflow side of the particle separator configured for splitting-off of ammonia from a reducing agent for selective catalytic reduction (SCR),
   wherein the catalyst material which promotes the splitting-off of the ammonia from the reducing agent contains as its active component at least one of $TiO_2$, $TiO_2/SiO_2$, $TiO_2/SiO_2/Al_2O_3$, and zeolites.

12. The particle separator according to claim 10, wherein, after being loaded with an SCR-active catalyst material, the particle separator is coated on the outflow side with respect to the main flow direction, with a catalyst material configured to oxidize excess ammonia in the exhaust gas, wherein the SCR-active catalyst material for the oxidation of excess ammonia contains elements of at least one of a platinum group and their oxides and zeolites.

13. The particle separator according to claim 8, wherein the at least one insert element comprises at least one of cordierite, aluminum titanate, silicon carbide, metal, metal foil, sintered metal, glass, and silicate, and
   the at least one insert element is connected by at least one of brazing, welding, a positive connection, a nonpositive connection, and produced as a single piece of uniform material.

14. The particle separator according to claim 5, wherein the plural flow channels comprise cross sections that are at least one of a same in themselves, a same as each other, and which are different at least in certain parts.

15. A sound damper housing with at least one particle separator according to claim 1, wherein the particle separator divides the sound damper housing into a raw gas-side exterior space and clean gas-side interior space, from which the clean gas flows through an outflow opening.

16. The sound damper housing according to claim 15, further comprising at least one of:
   an oxidation catalyst installed upstream of the sound damper housing, and
   an oxidation catalyst is installed in the sound damper housing upstream of the particle separator.

* * * * *